Inventors:
Paul H. Troutman,
Roger B. Hogan,
by Charles W. Helzer
Their Attorney.

Inventors:
Paul H. Troutman,
Roger B. Hogan,
by Charles W. Helzer
Their Attorney.

United States Patent Office 3,277,355
Patented Oct. 4, 1966

3,277,355
TERMINAL CONDITION PREDICTIVE CONTROL SYSTEM
Paul H. Troutman, Schenectady, N.Y., and Roger B. Hogan, Drexel Hill, Pa., assignors to General Electric Company, a corporation of New York
Filed Dec. 23, 1963, Ser. No. 332,758
9 Claims. (Cl. 318—28)

The present invention relates to a new and improved terminal condition predictive control.

More particularly, the invention relates to a terminal condition predictive control which is comparatively simple and less expensive than the previously available predictive controls, and makes possible the controlling of a system to be controlled to achieve a desired terminal operating condition in minimum time at a nearly optimum rate.

Presently available predictive control systems all operate on the principle of a bang-bang or on-off type of control wherein power or some other condition being controlled in either full-on or full-off. It is the nature of such a control that in order to maintain a median operating attitude, the bang-bang or on-off type of control oscillates between its full-on or full-off condition to provide a zero average output and thereby maintain the median operating attitude. This necessitates the expenditure of considerable energy in driving the control system between its two extremes, and hence such a system is inherently inefficient. To do away with these inefficiencies and to provide a smoother control, the present invention was devised.

It is therefore a primary object of the present invention to provide a new and improved terminal condition predictive control which operates to develop a corrective signal that is added to or subtracted from a desired reference condition signal to either accelerate or decelerate the controlled system to cause it to lock in on a desired terminal operating condition in minimum time at a nearly optimum rate.

In practicing the invention a terminal condition predictive control is provided for a controlled system which includes means for deriving a signal representative of the present position and present rate of change of the controlled system. A fast-time model of the controlled system is provided which has a transfer function similar to that of the controlled system, but operates on a fast-time basis. Selectively operable switching means serve to connect the desired reference condition signal to the fast-time model during each prediction cycle, and to couple the present position signal and the present rate of change signal of the controlled system to the fast-time model each time the predicted rate of change of the fast-time model passes through zero. Means are provided for supplying the desired reference condition signal to the controlled system and to the fast-time model simultaneously. Summing circuit means is provided which has its input terminals operatively coupled to the predicted future position output signal from the fast-time model, and to the desired condition reference signal source. The output of the summing circuit means is operatively connected to control the controlled system whereby the summing circuit derives a corrected control signal that is applied to the control system to achieve a desired terminal operating condition in minimum time at optimum rate.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 1:
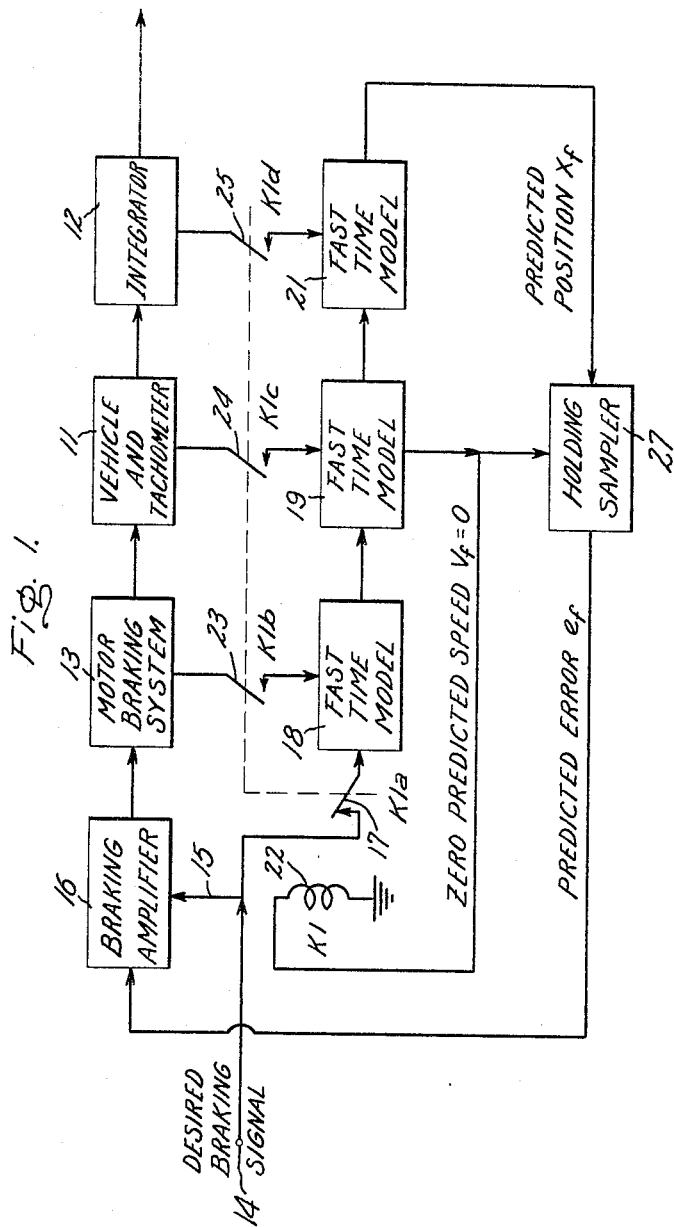
FIGURE 1 is a functional block diagram of the new and improved terminal condition predictive control constructed in accordance with the invention.

A terminal condition predictive control system constructed in accordance with the present invention is illustrated in FIGURE 1 of the drawings. While the control system of FIGURE 1 is designed primarily for use in conjunction with the motor-braking system of an automated rapid transit train such as that shown in FIGURE 3, it is to be expressly understood that the new and improved terminal condition predictive control system comprising the present invention could be adapted easily for use with any controlled vehicle or process such as a manufacturing process, a guidance system for a guided missile, a conventional aircraft landing system, or some other suitable application.

The terminal condition predictive control system in FIGURE 1 is designed to control a vehicle having a tachometer 11 mechanically coupled thereto for driving an output signal representative of the speed of the vehicle. The tachometer output is coupled to an integrator circuit 12 for deriving an output indication of the vehicle position. The vehicle is controlled by a motor-braking system indicated by the block 13 which provides a suitable braking force or a motoring force to drive the vehicle 11 in a manner to achieve a desired terminal operating condition in a minimum time at an optimum rate.

To accomplish the last mentioned end, a desired condition reference signal in the form of a prescribed braking rate signal is applied to an input terminal 14. This desired braking rate signal is coupled through the conductor 15 to a braking amplifier 16, and through a relay contact arm 17 to a fast-time model 18 of the motor-braking system 13. The fast-time model 18 of the motor-braking system 13 has its output supplied to a fast-time model 19 of the vehicle and tachometer 11, and the fast-time model 19 in turn has its output connected to a fast-time model 21 of the integrator 12. In order to read into each of the fast-time models 18, 19, and 21 the present state conditions of the controlled system, the relay control winding 22 which actuates the relay contact arm 17 for supplying the desired braking signal to the fast-time model system, is provided with three additional switching contact arms 23, 24, and 25. The additional relay contact arm 23 is connected between the output of the motor-braking system 13 and one input of the fast-time model 18, the additional contact arm 24 is connected between the output of the vehicle and tachometer 11 and one input of the fast-time model 19, and the additional contact arm 25 is connected between the output of the integrator 12 and one input of the fast-time model 21. By this arrangement, upon the relay control winding 22 being energized, the normally closed contact 17 is opened, and the nominally open contacts 23, 24, and 25 are closed to thereby read into the fast-time models 18, 19, and 21 the present state conditions of the motor-braking system 13, the present state conditions of the vehicle and tachometer 11, and the present state condition of the integrator 12, respectively.

The fast-time models 18, 19, and 21 are designed to operate at speeds 100 times or more rapidly than the actual controlled system; however, the fast-time models all have transfer characteristics or functions which are similar in form to the transfer characteristics or transfer functions of the controlled system. For this reason, the mathematical expressions describing the fast-time models are in fact the time scaled equations of the controlled system. The desired braking signal which constitutes the only input to the fast-time simulated system comprised by the fast-time models is applied through the normally closed relay contact arm 17 to a second input to the fast-time model 18 which then in conjunction with the fast-time model 19 and fast time model 21 function to develop output signals representative of the magnitude and polarity of the predicted error rate, and the predicted position error on a fast-time basis.

The fast-time predictions of the fast-time simulated system assume a controller input corresponding to the desired braking rate applied through terminal 14 to the motor braking system 13 of the controlled vehicle 11 at the precise instant of time that the prediction is initiated. During each prediction period, the desired braking rate signal is impressed on the fast-time simulated system until such time that the predicted error rate supplied from the output of the fast-time model 19 (and which is also the fast-time predicted vehicle speed) reaches zero. Upon this occasion, a current switching pulse is supplied to the relay control winding 22 which operates to disconnect the contact arm 17 from the fast-time simulated system, and to connect the contact arms 23, 24 and 25 to thereby read into the fast-time simulated system the present vehicle braking or motoring force, velocity and position.

Concurrently, with the above-described action, the fast-time model 21 functions to derive a fast-time predicted position error which is supplied through a holding and sampling circuit 27 back to the braking amplifier 16 along with the desired braking rate signal supplied through conductor 15. Upon the predicted error rate of the fast-time model output dropping to zero, the holding sampling circuit 27 applies a predicted position error signal to the braking amplifier 16 as a corrective braking signal. In the braking amplifier 16 this predicted position error signal is summed together with the desired braking rate signal, and the resulting corrected braking signal is applied to the motor-braking system 13. The corrected braking signal then operates through the motor-braking system 13 to either speed up or slow down the vehicle in accordance with the results of the fast-time prediction. Thereafter, the prediction cycles are repeated each time the fast-time predicted error rate passes through zero, and new present state vehicle position and velocity conditions are read into the fast-time simulated system along with the existing braking force to initiate a new prediction cycle. The prediction cycles then are continuously computed until such time that the desired terminal point is reached in minimum time and at an optimum rate.

Figure 2:
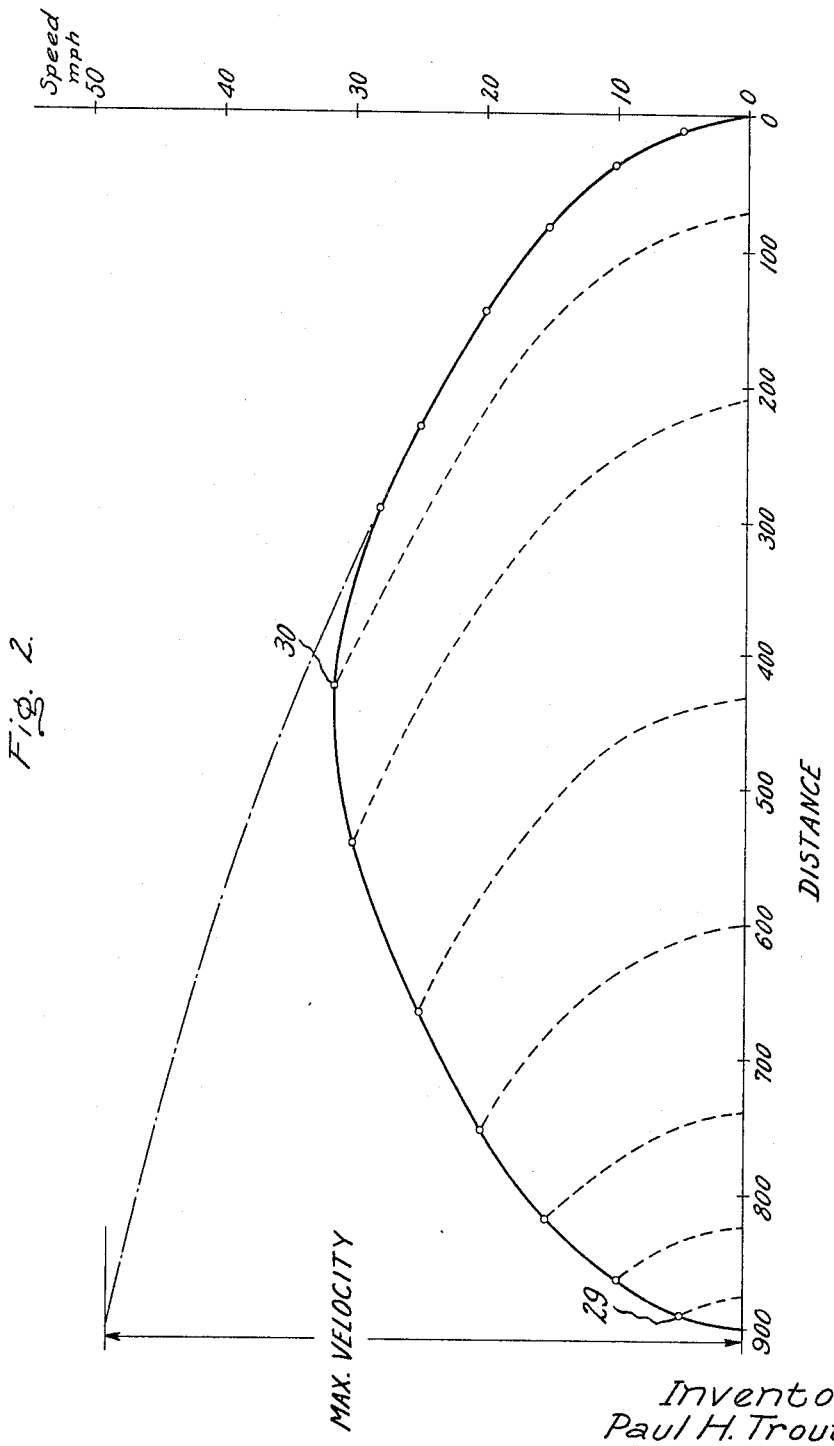
FIGURE 2 is a plot of the speed versus distance operating characteristic of the new and improved terminal condition predictive control system shown in FIGURE 1.

The automated stopping of a rapid transit vehicle employing the terminal condition predictive control system of FIGURE 1, is illustrated in FIGURE 2 of the drawings. FIGURE 2 portrays the worst imaginable condition where the controlled vehicle is at a standstill at the threshold of the braking region some 900 feet from the stopping point of a passenger platform. The dash-dot line in FIGURE 2 illustrates the desired braking rate curve if the vehicle were to approach this point at a maximum velocity of 50 miles per hour. With the vehicle at a standstill 900 feet from the terminal stopping point, the magnitude and polarity of the predicted position error produced by the predictive control system shown in FIGURE 1 will cause the motor-braking system controller to select the motoring phase of the operation of that system to cause the vehicle to be accelerated. At the outset (such as at point 29), the fast-time predictions indicate that the vehicle would stop substantially short of the desired terminal stopping point, if the controller input were to correspond to the desired braking rate signal only. As a consequence, the vehicle will continue to motor until such time that it reaches the vicinity of point 30 where, as a result of the continuous re-adjustment due to the repeated predictions indicating reductions in the fast-time predicted position error, the motoring of the vehicle is curtailed, and the vehicle changes from a motoring phase to a braking phase of operation. During the transition, the vehicle may coast momentarily. During subsequent fast-time prediction cycles, the controller input will call for increased braking effort as the stopping point is approached until such time that the vehicle locks on the desired braking rate curve indicated by the dash-dot line. Accordingly, it can be appreciated that the braking effort rises to a limiting value corresponding to the desired braking rate. Upon reaching this condition, all subsequent fast-time predictions will be projected along the desired braking rate curve which terminate precisely at the desired terminal position point, and hence the controller input will remain at the value yielding the desired (optimum rate) braking effort until the vehicle is brought to a complete stop.

It should be noted that the error phase plane portrait of the situation described in the preceding paragraph is defined exactly by FIGURE 2 of the drawing, and hence any such portrait would be redundant and is unnecessary. This is a direct result of the orientation of the control system towards terminal condition guidance so that the predicted fast-time vehicle stopping point, actually constitutes the predicted fast-time terminal error, and allows this signal to be used for corrective purposes. Accordingly, it can be appreciated that the new and improved terminal condition predictive control system makes it possible to stop a rapid transit vehicle smoothly at a prescribed location with high accuracy and with repeatability with a minimum wastage of time. If desired, the system could be readily adapted to use with other controlled vehicles or processes to accomplish a similar end result in minimum time at a nearly optimum rate.

From the foregoing description, it can be appreciated that in order to have the rapid transit vehicle stopped smoothly at prescribed locations with high accuracy and repeatability from the starting point of a well defined braking region, it is desirable that the motion of the vehicle conform as nearly as possible to a constant deceleration. However, the vehicle may be assumed to enter this well defined braking region at any speed that does not exceed the maximum defined by the capability of the driving motors of the vehicle. For this reason, provision must be made for motoring operation of the vehicle within the braking region in the event that the vehicle enters this region at too low a speed. As stated above, the worst possible operational situation would be for the vehicle to be at a dead stop at the threshold of the braking region.

In the event that the fast-time predicted position error signal derived from the fast-time simulated system indicates that the controlled vehicle is going to overshoot the desired terminal stopping point during any given prediction cycle, such a predicted position error signal will have passed through zero, and will of course have undergone a change in polarity. This change in polarity will be sensed by the motor-braking system, to be described more fully hereinafter, to provide increased braking over and above that called for by the desired braking rate signal. In this manner, the controlled vehicle will be caused to lock in on the desired braking rate to bring the vehicle to a halt at the terminal stopping point in minimum time at an optimum rate.

For the purposes of further illustration, it will be assumed that the new and improved terminal condition predictive control system will be used to control a rapid transit vehicle having a weight of 100 tons and a maximum speed of 50 miles per hour. In order to accelerate or decelerate a vehicle of this size, a nominal force gradient is required having a value:

$$f_n = \frac{100 \text{ lbs. force/ton of vehicle weight}}{\text{m.p.h. per second}} \quad (1)$$

and the nominal force to set the vehicle in motion becomes $$F_n = 10,000 \cdot a \text{ lbs. force} \quad (2)$$

where $a$ is equal to $dv/dt$, the acceleration or deceleration of the vehicle in miles per hour per second. The required tractive or braking effort is equal to the nominal force to accelerate or decelerate plus the vehicle resistance, plus the grade resistance, and plus the curve resistance. For convenience, the latter three quantities (which are secondary effects) shall be neglected. The value of the tractive or braking effort then becomes equal approximately to the nominal accelerating or decelerating force $$F_e = F_n = 10,000 \frac{dv}{dt} \text{ lbs. force} \quad (3)$$

This expression (3) defines the dynamic equation of the controlled vehicle.

Figure 3:
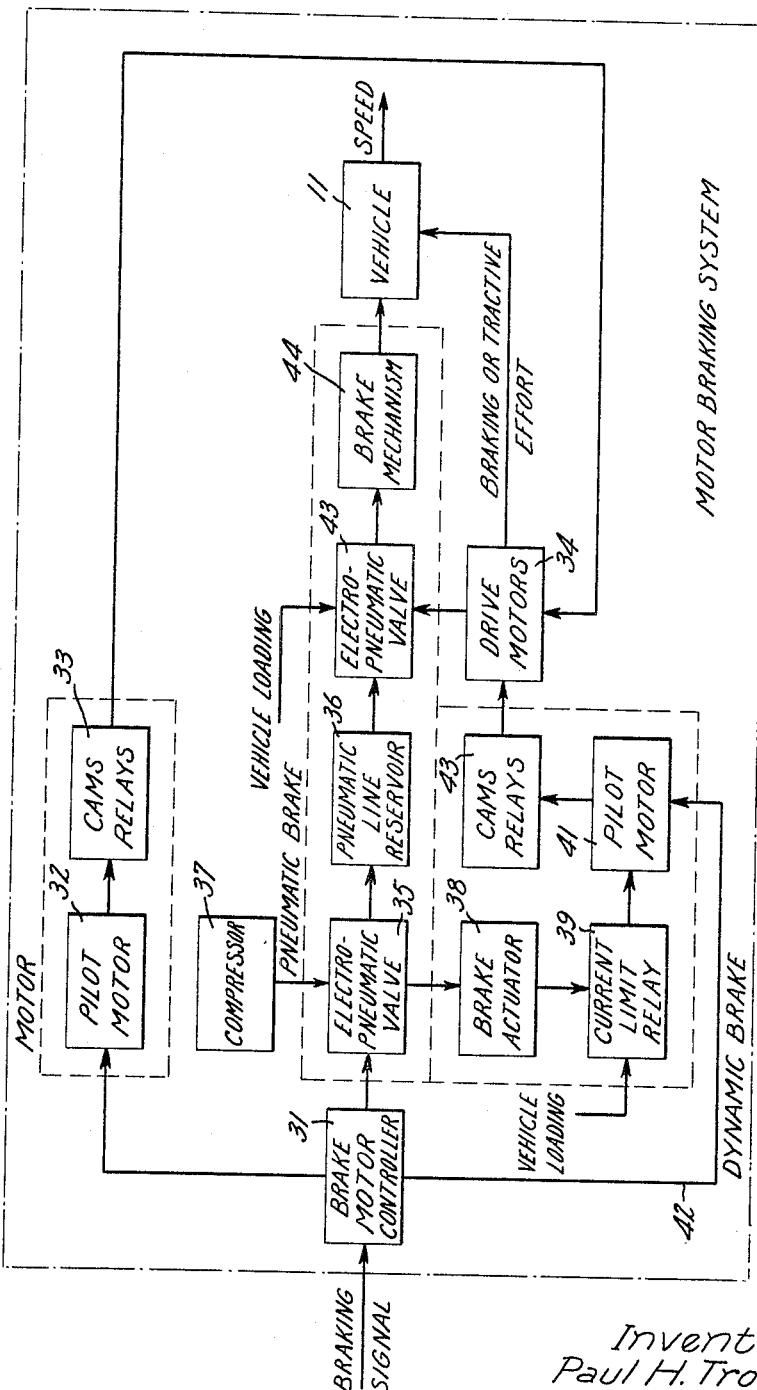
FIGURE 3 is a functional block diagram of a conventional motoring and braking system for a large vehicle such as a train; and which is to be controlled by the new and improved terminal condition predictive control.

The tractive or braking effort exerted on the controlled vehicle is developed by the motor-braking system shown in the functional block diagram of FIGURE 3. As best seen in FIGURE 1 of the drawings, the braking amplifier 16 develops a corrected braking signal that is supplied to the motor-braking system 13 shown in greater detail in FIGURE 3 of the drawings. The motor-braking system is comprised by a brake-motor controller unit 31 which determines whether to operate the system in either the braking or the motoring mode of operation from the polarity of the fast-time predicted position error added to the desired braking rate signal. In the motoring phase, the brake-motor controller unit 31 supplies a control signal to a pilot motor 32 whose shaft drives a plurality of cam operated relays 33. The cam operated relays 33 cause relay contacts to make and break in a predetermined sequence to provide field connections for a plurality of direct current series drive motors 34 that provide the tractive effort in the motoring phase of operation to the vehicle 11. In operation, the field connections established by the cam-operated relays 33 vary the field resistance of the D.C. series drive motors 34 in steps so that armature current, and consequently the tractive effort developed by the drive motors, is controlled in accordance with the control signal supplied from the brake-motor controller unit 31.

While the motor-braking system is operating in the braking mode, the brake-motor controller unit 31 controls a pneumatic valve 35 which monitors the air pressure fed into a pneumatic line reservoir 36 from a compressor 37. The electro-pneumatic valve 35 also operates through a spring loaded bellows and brake actuator mechanism 38 to control the potentiometer setting the armature of a current limiting relay 39. The current limiting relay 39 in turn controls the operation of a pilot motor 41 which is also controlled by a direct connection through line 42 by the brake-motor controller unit 31. The pilot motor 41 drives a plurality of rotating cams which actuate relay contacts in a cam operated relay 43 that controls field connections on the drive motors 34 to cause dynamic braking of the vehicle in much the same manner as during the motoring phase. Again the field resistance of the series D.C. drive motors 34 is varied in predetermined steps to achieve dynamic braking of the vehicle. Concurrently, the current limiting relay 39 senses the motor armature current and alternately engages and disengages the pilot motor 41 to cause the relay contacts to make and break. Accordingly, it can be appreciated that the manner of controlling the braking effort during the dynamic braking phase of operation is very nearly the same as that used in the control of the tractive effort during the motoring phase of operation.

Because of the dynamic braking of a vehicle fades as the speed of the vehicle is reduced, it is necessary to provide additional pneumatic braking in order to assure adequate braking at the lower speeds. This is accomplished with the air of a second electro-pneumatic valve 43 which is coupled to the output of the pneumatic line reservoir 36, and which monitors the air pressure fed into the brake cylinders 44. The second electro-pneumatic valve 43 is driven by a signal proportional to the magnitude of the dynamic braking exerted on the vehicle in a manner such that the variations in air pressure on the brake cylinders 44 are transmitted through the brake linkages to the brake shoe. The braking effort is of course developed as a frictional force between the brake shoes and the wheels of the vehicle. Accordingly, it can be appreciated that with the motor-braking system, either braking or tractive effort is applied to the vehicle to cause it to behave in the manner prescribed by the new and improved terminal condition predictive control system illustrated in block diagram form in FIGURE 1.

While the motor-braking system of FIGURE 3 has been illustrated in block diagram form only, such systems are well known in the locomotive and rapid transmit control technology, and need not be described in further detail. For example, if a more detailed description of suitable motor braking systems that can be adapted for use with the present control, is desired, reference is made to U.S. Patent No. 2,566,898 issued September 4, 1951, and U.S. Patent No. 3,034,031 issued May 8, 1962, both assigned to the same assignee (General Electric Co.) as the present application.

The braking system described above is characterized by a time delay caused by the air transport through the pneumatic line, and by the reaction time of the mechanical and pneumatic elements. This time delay can be approximated by the relation:

$$t_d \cdot \frac{dF_e}{dt} + F_e = KE_c \quad (4)$$

where $F_e$ is equal to the tractive or braking effort, $E_c$ is equal to the signal input of the brake-motor controlled unit 31, $t_d$ is equal to the magnitude of the time delay, and K is a gain constant. Using the above expression (4), the time delay $t_d$ was approximated at about 1 second, and the gain constant K was chosen to be 1,000 lbs. force/volts in view of the braking and motoring rates expected. Assuming these values, then the relationship between $F_e$ and $E_c$ is given by:

$$\frac{dF_e}{dt} + F_e = 1000 E_c \text{ lb. force} \quad (5)$$

For the purpose of the above expression, it is assumed that a continuous response may be had from the braking system in the region $-1.0$ m.p.h.p.s. $\leq a \leq +4.0$ m.p.h.p.s.

It should be noted that the relay switching contact arms 23, 24, and 25 of the predictive control of FIGURE 1 serve to couple the present value of the braking signal as well as the present valves of the speed and position of the controlled vehicle 11 to the fast time simulated system. The braking force signal may be derived from the ouput of the braking amplifier 16 directly, the vehicle velocity or rate is generated by a tachometer mechanically coupled to the vehicle, and the position of the vehicle is obtained by integrating the output of the tachometer. It is assumed that the sensitivity of the tachometer is in the order of 1 volt per foot per second, and in the output of the integrator 1 volt is equal to 10 feet. As a consequence of this arrangement, as shown in FIGURE 1, in the input signal supplied to the switching contact arm 23, 1 volt is equal to 1,000 pounds force, in the input signal supplied to the switch contact arm 24, 1 volt is equal to 1 foot per second, and in the input signal supplied to the switch contact 25, 1 volt is equal to 10 feet. The time scaled transfer function for the fast-time model of the motor-braking system 13 is given by the expression:

$$\overline{F}_e = \int (\overline{E}_c - \overline{F}_e) dT \qquad (6)$$

The transfer function for the vehicle and tachometer 11 is given by the expression:

$$\overline{V} = \int .1 \overline{F}_e dT \qquad (7)$$

and the transfer function of the integrator 12 is given by the expression:

$$\overline{X} = \int .1 \overline{V} dT \qquad (8)$$

All of these functions are simulated by the fast-time models 18, 19, and 21, respectively.

Figure 4:
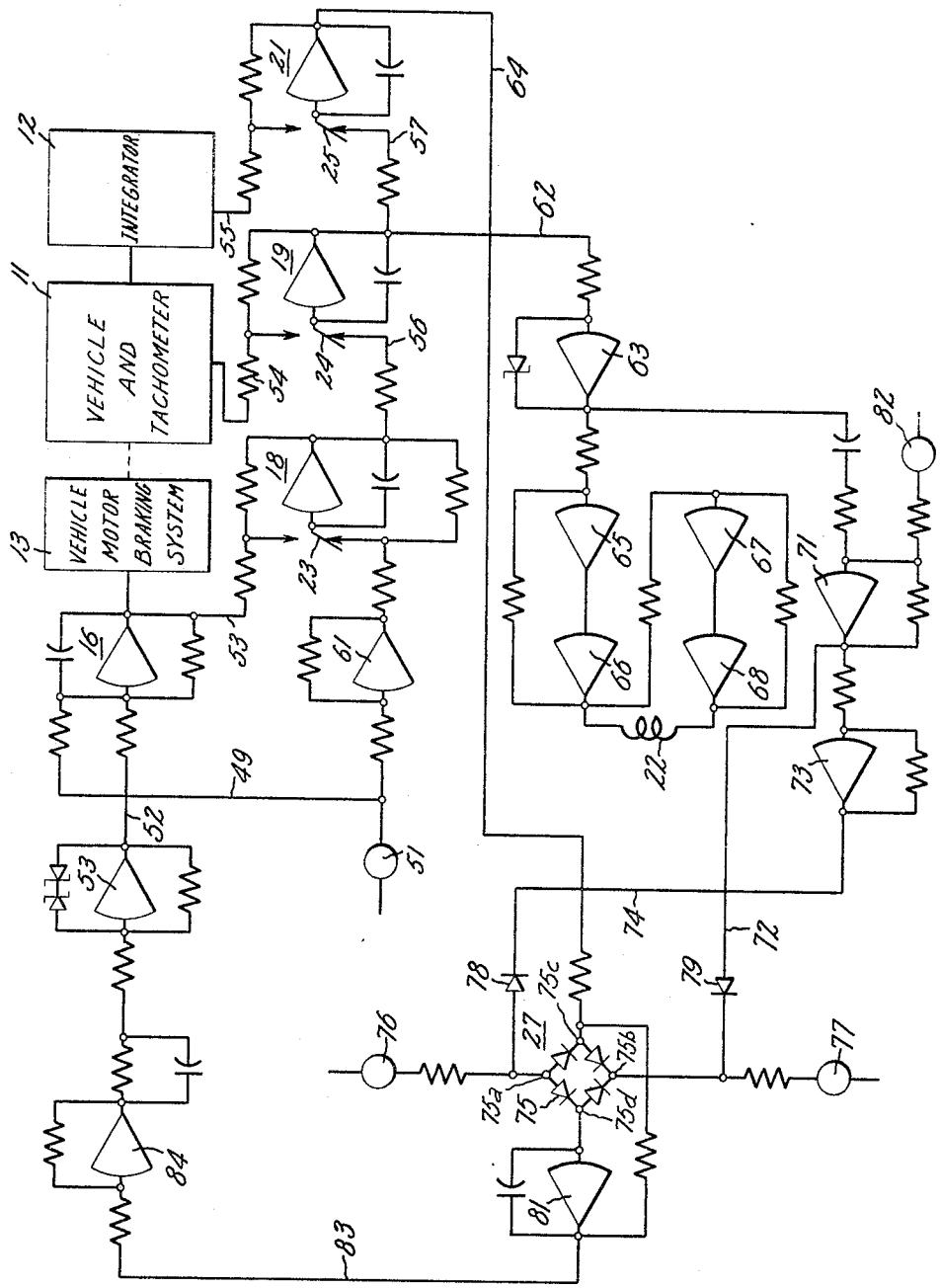
FIGURE 4 is a detailed circuit diagram of the new and improved terminal condition predictive control system illustrated in block diagram form in FIGURE 1.

A detailed circuit diagram of an analog form of the new and improved terminal condition predictive control system constructed in accordance with the invention is shown in FIGURE 4 of the drawings. The terminal condition predictive control system shown in FIGURE 4 is designed to operate with the vehicle and tachometer 11 which is mechanically controlled by the vehicle motor and braking system 13 shown in greater detail in FIGURE 3 of the drawings. The vehicle and motor-braking system 13 in turn is controlled by the output from a summing amplifier 16 which may be of the type described on pages 14 and 15 of the textbook entitled "Electronic Analog Computers" by Korn and Korn, second edition, published by the McGraw-Hill Book Company, 1956. The summing amplifier 16 has one of its input terminals operatively connected through a conductor 49 to the output of a potentiometer 51 which supplies a desired braking rate signal which, for example, may correspond to a desired braking rate of three feet per second. Summing amplifier 16 also has a second input terminal connected through a conductor 52 to the output of a limiting amplifier 53 whose function in the system will be described more fully later. The summing amplifier 16 serves to sum together the desired braking rate signal, and a corrective signal supplied over conductor 52 from the output of limiting amplifier 53 to derive a corrected braking signal that is supplied to the vehicle motor-braking system 13. The vehicle motor-braking system then causes the vehicle 11 to be either motored or braked to cause it to lock into the desired terminal operating condition prescribed by the control system.

To accomplish the above objective the fast-time models 18, 19, and 21 are provided. These fast-time models constitute conventional direct current operational amplifiers of the type described in chapter 4 of the above-referred to Korn and Korn textbook. The fast-time models 18, 19 and 21 have designed into them transfer functions similar to the characteristics of the vehicle motor and braking system 13, the vehicle and tachometer 11 and the integrator 12, respectively as set forth in Equations 6, 7 and 8 respectively. In order to apply the present state conditions of the controlled vehicle to the fast-time models, the output of the summing amplifier 16 is supplied through contact arm 23 to the fast-time model 18, the output of the vehicle tachometer 11 is supplied through the contact arm 24 to the fast-time model 19, and the output of the integrator 12 is supplied through the contact arm 25 to the fast-time model 21. It should also be noted that the fast-time model 18 has its output coupled through the conductor 56 and the lower contact of contact arm 24 to the input of the fast-time model 19, and the fast-time model 19 in turn has its output supplied through the conductor 59 and lower contact of contact arm 25 to the input of fast-time model 21. In this manner, the fast-time models 18, 19 and 21 are interconnected to form a fast-time simulated system of the controlled vehicle.

By reason of the above-described arrangement, upon the relay contacts 23, 24 and 25 being closed on their upper contacts, when the relay control winding 22 is energized, the present state output of the summing amplifier 16 will be impressed on the fast-time model 18, the present speed of the vehicle tachometer 11 will be impressed on the fast-time model 19, and the present position of the vehicle will be impressed on the fast-time model 21. While the fast-time models 18, 19 and 21 have all designed into them the same transfer function as their corresponding parts in the controlled vehicle, the fast-time models are designed to operate on fast-time basis in the neighborhood of 100 times faster than the actual controlled vehicle.

During each prediction period subsequent to the fast-time models having the present state conditions of the controlled vehicle impressed upon them and while the prediction calculations are being carried out, the control relay winding 22 is in its de-energized state. Hence, the contact arms 23, 24 and 25 fall back on their normally closed condition on the lower contact of each relay so as to connect each of the fast-time models together in a simulated system of the controlled vehicle. While connected in this manner, the desired braking rate signal from potentiometer 51 is impressed on the input of fast-time model 18 of the vehicle through an inverting amplifier 61 of conventional construction, and through the contact arm 23. The fast-time simulated system then functions on a fast-time basis to predict what will happen to the controlled vehicle 11 if at that point in time, the motor-braking system has impressed upon it only the desired braking rate signal. The simulated system then operates on a fast-time basis, and under the above-assumed condition, to develop at the output of the fast-time model 19 an output signal representative of the predicted velocity error or error rate of the controlled vehicle 11, and to develop at the output of the fast-time model 21 an output signal representative of the predicted position error of the controlled vehicle. The predicted velocity error (error rate) is supplied over a conductor 62 to the input of a limiting amplifier 63 which is feedback-limited with a Zener diode, and the predicted position error is supplied over a conductor 64 to the input of a holding and sampling circuit 27.

The output of the limiting amplifier 63 is zero valued through each prediction cycle until such time that the voltage output of the fast-time model 19 drops to zero corresponding to the condition where the predicted vehicle velocity changes sign. Upon the output of the fast-time model 19 passing through zero, the output of the limiting amplifier 63 immediately rises to a limiting value of $+50$ volts. This limited output voltage from amplifier 63 drives the differentially connected ampifier configuration composed of direct current amplifiers 65, 66, 67 and 68 which in turn energize the relay control winding 22. The differentially connected amplifiers 65 and 66 are conventional in construction (see page 209 of the above Korn and Korn textbook), and the additional amplifiers 66 an 68 provide sufficient actuating current for the relay control winding 22. The relay control winding 22 controls the contact arms 23, 24 and 25, and when energized, causes these contact arms to be closed on their upper contacts thereby reading into the simulated fast-time system the present state conditions of the controlled vehicle. Application of present state conditions drives the output voltage of amplifier 63 to zero thereby defining a rectangular voltage pulse at the output of the limiting amplifier 63. As a result, relay control winding 22 again becomes de-energized, and allows the contact arms 23, 24 and 25 to drop back to their normally closed condition on the lower contacts thereby initiating a new prediction cycle. At the end of the new prediction cycle, when the predicted velocity error again drops to zero, the relay control winding 22 will again be energized to repeat the process.

From a consideration of FIGURE 2 of the drawings, it can be appreciated that continuing predictions will be produced at each of the points such as 29, 30 by the terminal condition predictive control system with each prediction cycle being terminated each time that the predicted velocity error or error rate passes through zero. Upon the actual controlled vehicle locking in on the dash-dot desired braking rate curve shown in FIGURE 2, these predictions will be continued as the vehicle follows down the prescribed braking rate cure in the above-described manner.

The form of the signal at the output of the limiting amplifier 63 is that of rectangular pulses occurring on a variable frequency repetitive basis for the duration of the motoring-braking program. These pulses are differentiated by a differentiating amplifier 71 of the type described in chapter 1–4 of the above identified textbook by Korn and Korn. Differentiating amplifier 71 produces voltage spikes corresponding to the leading and trailing edges of the pulses appearing at the output of the limiting amplifier 63. The differentiated signal pulses are then supplied through the conductor 72, and through an inverting amplifier 73 and conductor 74 to the sample and hold circuit 27 to gate this circuit on and off.

The holding and sampling circuit 27 is comprised by a diode rectifier bridge 75 having one set of opposite terminals or nodes 75a and 75b connected to separate sources of biasing voltage. For this purpose, one terminal or node 75a is connected to a potentiometer 76 through a voltage dropping resistor, and the remaining opposite terminal or node 75b is connected to a potentiometer 77 through a voltage dropping resistor. The terminal or node 75a also is coupled back through a diode rectifier 78 to the output of the inverting amplifier 73, and the terminal or node 75b is connected back through a coupling diode 79 to the output of the differentiating amplifier 71. The predicted position error signals supplied over the conductor 64 from the output of the fast time model 21 are applied to one of the remaining terminals 75c of the diode bridge 75 and the remaining opposite terminal 75d of the diode bridge is connected to the input of a direct current amplifier 81.

With the above arrangement, in the absence of a gating signal supplied from the output of the differentiating amplifier 71, a bias potential supplied from a potentiometer 82 of −50 volts produces output potentials of +50 volts at the output of the differentiating amplifier 71, and −50 volts at the output of the inverting amplifier 73. The output potentials at the outputs of each of these amplifiers causes the diodes 78 and 79 to be rendered conductive. As a consequence, the magnitude and polarity of the voltages applied across the opposite terminals or nodes 75a and 75b of the diode bridge, drives the bridge 75 into a non-conducting state. When the bridge 75 is non-conducting, the output of the amplifier 81 is held at a value equal to the state of the charge of the feedback capacitor coupled across this amplifier. Upon the occurrence of a negative gating spike, at the output of differentiating amplifier 71 (which corresponds to the leading edge of an output pulse from the limiting amplifier 63) the diodes 78 and 79 are momentarily cut off, and permit the diode bridge 75 to conduct. During the instant that the bridge 75 is conducting, the junction of the diodes connected to amplifier 81, and the junction of the diodes connected to conductor 64 are constrained to remain at the same potential thereby permitting the minute current unbalance supplied across conductor 64 from the output of fast-time model 21 to be applied to the input of the amplifier 81. With the diode bridge conducting in this manner, the voltage output of the amplifier 81 will rise exponentially to the value of the voltage output of the fast-time model 21. To assure that this indeed happens, the time constant in the feedback around the amplifier 81 is designed to permit the state of charge on the feedback capacitor to reach the level of the output voltage of the fast-time model 21. Subsequent to the passage of the gating pulse, diodes 78 and 79 will resume conduction, and the diode bridge 75 is driven back into its non-conducting state.

The output signal produced by the amplifier 81 will correspond to the state of charge of the feedback capacitor, and is equal in value to the voltage output of the fast-time model 21 at the time when sampled by the sample and gating signal 27. This ouput potential which is indicative of the predicted position error is supplied through a conductor 83 to a direct current amplifier 84 that serves to invert and amplify the signal, and increases the sensitivity of the controlled system by making the closed loop "tighter." The output of amplifier 84 is supplied to the input of the limiting amplifier 53, which in turn has its output connected to the summing amplifier 16 to provide the desired correction signal to the summing amplifier. The amplifier 53 is feedback limited by a pair of Zener diodes so as to simulate the saturation characteristics of the controlled vehicle by limiting the corrective signal applied back through the loop to prescribed limits representative of the limited velocity capability of the vehicle being controlled. The corrective signal supplied from the output of amplifier 53 over conductor 52 to the input of the summing amplifier 16 is then summed with the desired braking rate signal supplied from the potentiometer 51 to thereby develop a corrected braking/motoring signal for application to the motoring-braking system of the controlled vehicle.

Saving described the construction of the new and improved terminal condition predictive control system, its operation will be discussed in conjunction with FIGURE 2 of the drawings. If it is assumed that the vehicle is stopped 900 feet from its desired stopping point within the braking range illustrated in FIGURE 2, it can be appreciated that it will be first necessary to accelerate the vehicle towards the desired stopping point. Under these conditions, the desired braking rate signal will be supplied through the summing amplifier 16 and will result in a predetermined braking force being applied by the motor-braking system to the controlled vehicle. Simultaneously, this desired braking rate signal is applied through the amplifier 61 to the fast-time simulated system comprised by the fast-time models 18, 19 and 21. The fast-time models will function on a fast-time basis to develop output signals representative of the predicted vehicle velocity, and predicted vehicle position error based on the then present condition of the controlled vehicle. Upon the predicted vehicle velocity signal supplied by fast-time model 19 over conductor 62 passing through zero, the relay control winding 22 will be actuated to cause the control arms 23, 24 and 25 to be closed on their upper contacts thereby reading into the fast-time model the present state condition of the controlled vehicle.

Concurrently, with the above operation, the sample and hold circuit 27 comprised by the diodes rectifier bridge 75 will supply the predicted position error signal through conductor 64 to amplifier 81 and back through limiting amplifier 53 to the summing amplifier 16. The summing amplifier 16 then sums together the predicted position error signal with the desired braking rate signal to derive an output corrected control signal that is supplied to the motor-braking system of the controlled vehicle. The motor controller unit 31 of the motor-braking system shown in FIGURE 3 then operates to determine whether the vehicle should be accelerated or braked, and applies the appropriate tractive or braking effort to the vehicle in the manner described earlier. As a consequence, the stopped vehicle will be caused to accelerate to a speed defined by the solid line curve shown in FIGURE 2 to some point such as 29 where because of the fact that a prediction cycle has been completed, a new prediction cycle will be initiated. The new prediction cycles are initiated at the end of each previous prediction cycle so that the predicted position error signals are supplied to the summing amplifier 16 at a frequency determined by the time required to complete each successive prediction cycle. In this manner, the velocity of the vehicle will be caused to increase along the solid line curve shown in FIGURE 2 until at some point such as 30 it is indicated that further acceleration is not required, at which point the vehicle may coast for a whole prior to the predictive control system calling for a braking effort from the motor-braking system. Upon this occasion, the vehicle will lock in with the prescribed braking rate signal, and the vehicle will be caused to decelerate along a line coincident with that of the dash-dot line representing the desired braking rate.

From the above description it can be appreciated, that the new and improved terminal condition predictive control system causes the controlled vehicle to lock in with a desired terminal operating condition in minimum time and in a nearly optimum manner. Accordingly, it can be appreciated that the invention provides a terminal condition predictive control which operates to develop a corrective signal that, depending upon its polarity, is added to or subtracted from a desired reference condition signal to either accelerate or decelerate the controlled system at a rate determined by the magnitude of the corrective signal to cause it to lock in on the desired terminal operating condition in minimum time and at an optimum rate.

Having described one embodiment of a new and improved terminal condition predictive control system constructed in accordance with the invention, it is believed that the other modifications and variations of the present invention are possible in light of the above teachings. It is therefore to be understood that changes may be made in the particular embodiment of the invention described which are within the full intended scope of the invention as defined by the appended claims.

What we claim as new and desire to secure by Letters Patent of the United States is:

1. A terminal condition predictive control system for a variable controlled system comprising a fast-time model of the controlled system having characteristics substantially similar in form to the characteristics of the variable controlled system but operating on a fast-time basis, reference signal means for applying a reference signal to the controlled system and to said fast-time model for operating the same in accordance with a desired optimum operating condition, the fast-time model including first prediction means for developing signals representing the predicted future values for the output of the controlled device and the rate of the controlled device at some point in time in the future, error deriving circuit means operatively coupled to the output of the fast-time model for deriving an error signal representative of the predicted future error of the fast-time model, summing circuit means operatively connected to control the operation of said variable controlled system and having its inputs operatively coupled to the outputs from the reference signal means and the error deriving circuit means for controlling the operation of the variable controlled device in response to the predicted future error, and resetting means operatively coupled to said fast-time model for resetting the predictive operation of the prediction means each time the predicted error rate reaches zero to thereby initiate a new prediction based on the new present state condition of the variable controlled device.

2. The combination set forth in claim 1 wherein said error deriving circuit means includes means for sensing a change in polarity of the predicted future error rate, and means for supplying the predicted future position error to the summing circuit means at the point in the output of the variable controlled device where the predicted future output error rate reversed polarity.

3. The combination set forth in claim 1 wherein the fast-time model is compensated in its speed of response to allow for movement of the actual variable controlled system during the prediction period.

4. The combination set forth in claim 1 wherein the fast-time model is compensated in its speed of response to allow for movement of the actual variable controlled system during the prediction period, and wherein the error deriving circuit means includes means for sensing a change in polarity of the predicted future error rate, and means for supplying the predicted future position error to the summing circuit at the point in the actual output of the variable controlled device where the predicted future error rate reversed polarity.

5. A terminal condition predictive control for a controlled system including in combination means for deriving signals representative of the present position and present rate of change of a controlled system, a fast-time model of the controlled system having a transfer function similar in form to that of the controlled system but operating on a fast-time basis, selectively operable switching means operatively coupled to and controlled by the fast-time model for applying the present position signal and the present rate of change signal to the fast-time model each time the predicted rate of change of the fast-time model passes through zero, means for supplying a desired condition reference signal to the controlled system and to the fast-time model, and summing signal circuit means having its input terminals operatively coupled to the predicted future position output from the fast-time model, and to the desired condition reference signal source and adapted to be operatively connected to control the controlled system whereby the summing circuit means derives a corrected control signal that can be applied to the controlled system to achieve a desired terminal operating condition in minimum time at an optimum rate.

6. A terminal condition predictive control for a controlled system including in combination a motoring and braking sub-system comprised by a controller adapted to be operatively coupled to and selectively control the positive applied power phase of operation and the negative applied power phase of operation of a controlled system, means for deriving signals representative of the present position and present rate of change of the controlled system, a fast-time model of the controlled system having a transfer function similar to that of the controlled system but operating on a fast-time basis, selective switching means operatively coupled to and controlled by said fast-time model for applying the present position signal and the present rate of change signal to the fast-time model each time the predicted rate of change of the fast-time model passes through zero, means for supplying a reference condition signal to the controlled system and to the fast-time model, and summing circuit means having its input terminals operatively coupled to the output of said fast-time model and to the reference condition signal source and having its output coupled to said controller for causing the controlled system to achieve a desired terminal operating condition in minimum time at an optimum rate.

7. A terminal condition predictive control for a controlled system including in combination a motoring and braking sub-system comprised by a motor-brake controller operatively coupled to and selectively controlling the motoring phase of operation and the braking phase of operation of a controlled system, means for deriving signals representative of the present position and present rate of change of the controlled system, a fast-time model of the controlled system having a transfer function similar to that of the controlled system but operating on a fast-time basis, selective switching means operatively coupled to and controlled by said fast-time model for applying the present position signal and the present rate of change signal to the fast-time model each time the predicted rate of change of the fast-time model passes through zero, means for supplying a reference braking signal to the controlled system and to the fast-time model, and summing circuit means having its input terminals operatively coupled to the output of said fast-time model and to the reference braking signal source and having its output coupled to said motor-brake controller to cause the controlled system to achieve a desired terminal operating condition in minimum time at an optimum rate.

8. A terminal condition predictive control for a controlled system including in combination means for deriving signals representative of the present position and present rate of change of the controlled system, a fast-time model of the controlled system having a transfer function similar to that of the controlled system but operating on a fast-time basis, selectively operable switching means for operatively coupling the present position signal and the present rate of change signal to the fast-time model, actuating means operatively coupled to the fast-time model and to the selectively operable switching means for actuating the switching means in response to the predicted rate of change of the fast-time model passing through zero, means for supplying a desired braking reference signal to the controlled system and to the fast-time model, error signal deriving means coupled to the output of said fast-time model for deriving a predicted position error signal, and summing circuit means operatively connected to control said controlled system and having its input terminals coupled to said error signal deriving means and to said desired braking reference signal source for deriving a corrected braking signal that is applied to said controlled system to achieve a desired terminal operating condition in minimum time at an optimum rate.

9. A terminal condition predictive control for a controlled system including in combination a motoring-braking sub-system comprised by a motor-brake controller operatively coupled to and selectively controlling the motoring phase and the braking phase of operation of the controlled system, means for deriving signals representative of the present position and present rate of change of the controlled system, a fast-time model of the controlled system having a transfer function similar to that of the controlled system, but operating on a fast-time basis, selectively operable switching means for operatively coupling the present position signal and the present rate of change signal to the fast-time model, actuating means operatively coupled to the fast-time model and to the selectively operable switching means for actuating the switching means in response to the predicted rate of change of the fast-time model passing through zero, means for supplying a desired braking reference signal to the controlled system and to the fast-time model, error signal deriving means coupled to the output of said fast-time model for deriving a predicted position error signal, and summing circuit means having its output operatively connected to said motor-brake controller and having its input terminals coupled to said error signal deriving means and to said desired braking reference signal source for deriving a corrected braking signal that is applied to said motor-controller to cause said controlled system to achieve a desired terminal operating condition in minimum time at an optimum rate.

References Cited by the Examiner

UNITED STATES PATENTS

| | | | |
|---|---|---|---|
| 2,842,311 | 7/1958 | Petrie | 235—61 |
| 3,059,880 | 10/1962 | Buxton | 244—77 |
| 3,105,928 | 10/1963 | Congleton et al. | 318—28 |
| 3,221,151 | 11/1965 | Cattel et al. | 318—49 X |
| 3,221,238 | 11/1965 | Unger et al. | 318—489 |
| 3,225,179 | 12/1965 | Chestnut et al. | 318—489 X |

References Cited by the Applicant

"Principles of Model Techniques in Optimizing Control," by Eckman and Lefkowitz, Proc. of the First International Congress of the International Federation of Automatic Control held in Moscow, U.S.S.R., 1960, published by Butterworths-London, 1961, vol. II, pp. 970–976.

"Possibilities of a Two-Time Scale Computing System for Control and Simulation of Dynamic Systems," by H. Ziebolz and H. M. Paynter, vol. IX, pp. 215–223, Proceedings of the National Electronics Conference, 1953, pub. Feb. 15, 1954, by the National Electronics Conference, Inc.

ORIS L. RADER, *Primary Examiner.*

G. SIMMONS, *Assistant Examiner.*